United States Patent
Sawahata

(10) Patent No.: US 6,681,201 B1
(45) Date of Patent: Jan. 20, 2004

(54) SIMULATION METHOD OF BREAKDOWN

(75) Inventor: Kouichi Sawahata, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 09/575,280

(22) Filed: May 22, 2000

(30) Foreign Application Priority Data

May 25, 1999 (JP) ............................. 11-144659

(51) Int. Cl.$^7$ .................... G06F 17/10; G06F 7/66; G06F 17/50; G06G 7/48

(52) U.S. Cl. .................... 703/2; 703/6; 703/13

(58) Field of Search .................... 703/2, 6, 13

(56) References Cited

U.S. PATENT DOCUMENTS

| | | | | |
|---|---|---|---|---|
| 5,627,772 A | * | 5/1997 | Sonoda et al. ............ | 703/14 |
| 5,912,824 A | * | 6/1999 | Sawahata .................. | 703/6 |
| 5,933,359 A | * | 8/1999 | Sawahata .................. | 716/2 |

\* cited by examiner

Primary Examiner—Hugh Jones
(74) Attorney, Agent, or Firm—Scully, Scott, Murphy & Presser

(57) ABSTRACT

An electric field distribution is calculated by means of a drift diffusion model, and a one-dimensional electric field distribution is taken out from a result of the calculation, and this electric field distribution which was taken out is provided to a one-dimensional Monte Carlo device simulation to calculate a distribution of impact ionization coefficients, and $G^n(x)$ is calculated by using an equation 1 to an equation 5 which are described below $$G^1(x) = \frac{1}{q}i_n^0 \cdot \alpha_{n,(x_0)}(x) + \frac{1}{q}i_p^0 \cdot \alpha_{p,(x_\omega)}(x) + \int_{x_0}^{x_\omega} G^0(x')\alpha_{n,(x')}(x)dx' + \int_{x_0}^{x_\omega} G^0(x')\alpha_{p,(x')}(x)dx' \quad [\text{Eq. 1}]$$

$$G^2(x) = \int_{x_0}^{x_\omega} G^1(x')\alpha_{n,(x')}(x)dx' + \int_{x_0}^{x_\omega} G^1(x')\alpha_{p,(x')}(x)dx' \quad [\text{Eq. 2}]$$

$$G^{n+1}(x) = \int_{x_0}^{x_\omega} G^n(x')\alpha_{n,(x')}(x)dx' + \int_{x_0}^{x_\omega} G^n(x')\alpha_{p,(x')}(x)dx' \quad [\text{Eq. 3}]$$

$$\int_{x_0}^{x_\omega} G^n(x')\alpha_{n,(x')}(x)dx' \quad [\text{Eq. 4}]$$

$$\sum_{i=1}^{N} G^n(x_i)\alpha_{n,(x_i)}(x)\Delta x_i \quad [\text{Eq. 5}]$$

and as a result of this calculation, it is determined that a breakdown does not occur in case that, as n becomes to be large, $G^n(x)$ converges to a constant value, and final electric current density is calculated, and it is determined that a breakdown occurs in case that $G^n(x)$ becomes to be large as n increases.

9 Claims, 2 Drawing Sheets

SIMULATION METHOD OF BREAKDOWN

BACKGROUND OF THE INVENTION

The present invention relates to a simulation method of a breakdown, for simulating a phenomenon of impact ionization, which occurs in series.

In a conventional method, as shown by a dotted line D of FIG. 3, an impact ionization coefficient α(E) is calculated from a magnitude of an electric field. Here, this impact ionization coefficient α(E) is a coefficient on the assumption that a carrier is instantaneously accelerated. In the conventional method, by using this impact ionization coefficient, generation $G^{II}$, of a carrier is calculated in accordance with an equation 6 described below (by means of an ISE manual):

$$G^{II} = \alpha_n \cdot n \cdot v_n + \alpha_p \cdot p \cdot v_p \quad [\text{Eq. 6}]$$

And, the generation of a carrier is calculated from the calculated impact ionization coefficient, and the generated carrier is combined with an original electric current, and the current increases, and a calculation of a phenomenon in which the impact ionization is also caused by the increased electric current is automatically obtained by calculating the drift diffusion model. Here, in FIG. 3, a solid line E indicates electric field strength, and a broken line F indicates an impact ionization coefficient in case that a process in which a carrier is accelerated is taken into account.

In the above-described conventional method, the electric field strength and the impact ionization coefficient are made to be a one-to-one function, and accordingly, if an electric field exists, a carrier is fully accelerated in the field.

Accordingly, compared with an actual fact, in the calculation, the impact ionization occurs too much. Such a task occurs because, as mentioned above, the electric field strength and the impact ionization coefficient are made to be a one-to-one function.

In the conventional model, in case that an electric field exists, a carrier is fully accelerated in the field and impact ionization occurs. However, actually, for accelerating a carrier, it is necessary that the carrier runs quite a long distance.

Accordingly, in the conventional model, since the impact ionization occurs greater than a reality, the calculation is not conducted correctly. Also, due to that, a breakdown voltage becomes to be smaller than a reality. As a result, in the conventional method, the impact ionization (or the breakdown) cannot be estimated correctly.

SUMMARY OF THE INVENTION

The present invention is made to solve the above-mentioned problems.

Moreover, the objective is to provide a simulation method of a breakdown, in which the impact ionization (or the break down) cannot be estimated correctly.

In accordance with the present invention, in a simulation method of a breakdown, an electric field distribution is calculated by means of a drift diffusion model, and a one-dimensional electric field distribution is taken out from a result of the calculation, and the electric field distribution which was taken out is provided to a one-dimensional Monte Carlo device simulation to calculate a distribution of impact ionization coefficients, and $G^n(x)$ is calculated by using an equation 1 to an equation 5 which are described in the above-described scope of claim for patent, and as a result of this calculation, it is determined that a breakdown does not occur in case that, as n becomes to be large, $G^n(x)$ converges to a constant value, and final electric current density is calculated, and it is determined that a breakdown occurs in case that $G^n(x)$ becomes to be large as n increases.

$$G^1(x) = \frac{1}{q} i_n^0 \cdot \alpha_{n,(x_0)}(x) + \frac{1}{q} i_p^0 \cdot \alpha_{p,(x_\omega)}(x) + \quad [\text{Eq. 1}]$$
$$\int_{x_0}^{x_\omega} G^0(x')\alpha_{n,(x')}(x)dx' + \int_{x_0}^{x_\omega} G^0(x')\alpha_{p,(x')}(x)dx'$$

$$G^2(x) = \int_{x_0}^{x_\omega} G^1(x')\alpha_{n,(x')}(x)dx' + \int_{x_0}^{x_\omega} G^1(x')\alpha_{p,(x')}(x)dx' \quad [\text{Eq. 2}]$$

$$G^{n+1}(x) = \int_{x_0}^{x_\omega} G^n(x')\alpha_{n,(x')}(x)dx' + \int_{x_0}^{x_\omega} G^n(x')\alpha_{p,(x')}(x)dx' \quad [\text{Eq. 3}]$$

$$\int_{x_0}^{x_\omega} G^n(x')\alpha_{n,(x')}(x)dx' \quad [\text{Eq. 4}]$$

$$\sum_{i=1}^{N} G^n(x_i)\alpha_{n,(x_i)}(x)\Delta x_i \quad [\text{Eq. 5}]$$

Here, the above-described electric field distribution is calculated by conducting a simulation by means of the above-described drift diffusion model, in which an inverse bias is applied to a semiconductor element including an element isolating region.

Also, the above-described semiconductor element has a device structure including a two-dimensional diode structure, for example.

In addition, the above-described semiconductor element has a device structure including a three-dimensional diode structure, for example.

Furthermore, the above-described element isolating region may be formed of a LOCOS (Local Oxidation of Silicon).

Also, the above-described one-dimensional electric field distribution is taken out by cutting out a part in an electric field direction in one dimension, which has the largest electric field out of the calculated electric field distribution.

In this case, the above-described part which has the largest electric field is, for example, an end portion of the element isolating region formed of the above-described LOCOS.

BRIEF DESCRIPTION OF THE INVENTION

This and other objects, features, and advantages of the present invention will become more apparent upon a reading of the following detailed description and drawings, in which.

DESCRIPTION OF THE EMBODIMENTS

In an embodiment of the present invention, a calculation of $G^n(x)$ is conducted by conducting a simulation by means of a drift diffusion model and performing a one-dimensional full band device simulation. More particularly, an electric field distribution which was calculated by the drift diffusion model is provided to a one-dimensional Monte Carlo device simulation to calculate impact ionization coefficients, and by using the calculated impact ionization coefficients, a phenomenon of impact ionization, which occurs in series, is simulated.

Here, generally, a particle distribution and so forth are simulated by obtaining particle condition using a Monte Carlo method so as to be subject to an arbitrary probability density function. This Monte Carlo method is a method for generating a random number and analyzing a probable phenomenon, and is being used in a wide field such as a calculation in plasma physics, fluid mechanics, molecular dynamics, an semiconductor characteristic analysis and so forth, in which performance of particles is calculated, and optimization of a statistical phenomenon.

In this Monte Carlo method, whether or not one particle causes a certain probable phenomenon is determined by using a probability density function and a random number, and it is determined by comparing a probability that the particle causes a certain phenomenon with the random number.

The First Embodiment

The first embodiment of the present invention will be explained below by introducing a semiconductor element as an example in accordance with FIG. 1.

Figure 1:
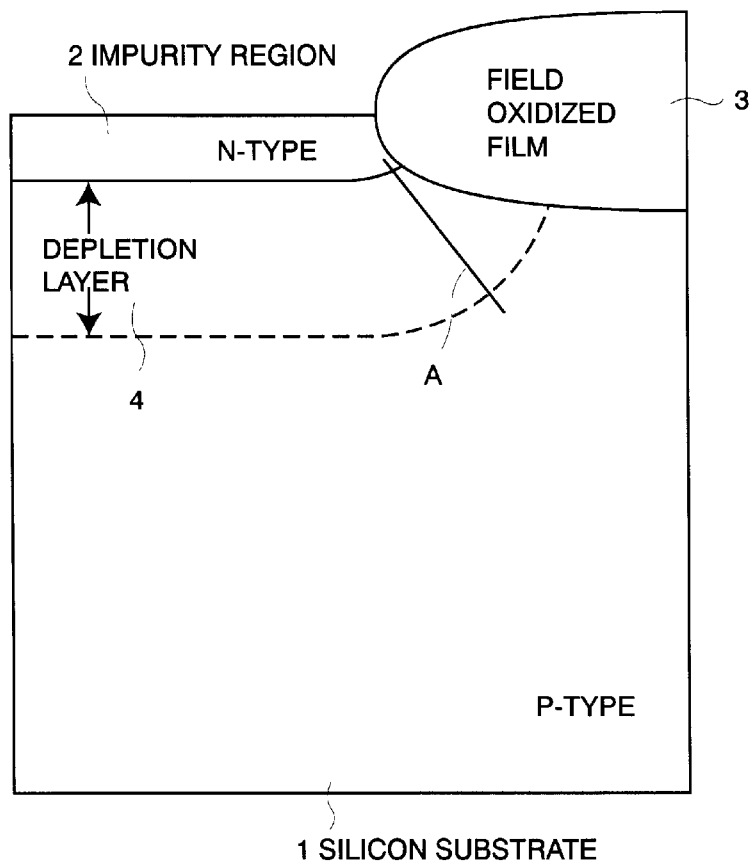
FIG. 1 is a view for explaining the first embodiment of the present invention.

As shown in FIG. 1, an n-type impurity region 2 and a field oxidized film 3 that is an element isolating region are formed in a p-type silicon substrate 1. The silicon substrate 1 is a low concentration arsenic region (for example, about 1E17 cm$^{-3}$), for example, and the impurity region 2 is a high concentration arsenic region (for example, about 1E20 cm$^{-3}$).

Also, the field oxidized film (element isolating region) 3 is formed of a LOCOS (Local Oxidation of Silicon). Furthermore, a depletion layer 4 is formed under the impurity region 2.

Under such an arrangement, an electric field distribution in a certain voltage is calculated by conducting a simulation by means of a drift diffusion model, in which an inverse bias is applied to a two-dimensional diode structure including the field oxidized film 3 formed of the LOCOS.

And, a potential distribution is taken out by cutting out a part in an electric field direction in one dimension (a solid line A in FIG. 1), which has the largest electric field out of the calculated two-dimensional electric field distribution.

Here, the two-dimensional structure diode including the field oxidized film 3 has electric field strength which becomes to be strong at an end portion of the field oxidized film 3, since a shape of junction of the diode has curvature at the end portion of the field oxidized film 3. Accordingly, a part which has the largest electric field corresponds to the end portion of the field oxidized film 3.

Figure 2:
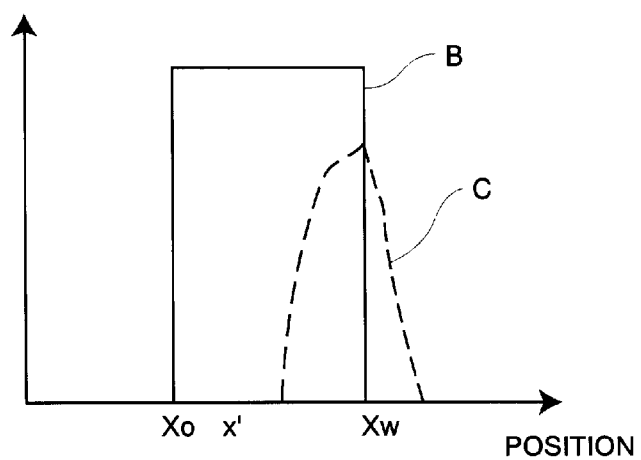
FIG. 2 is a view showing a one-dimensional full band Monte Carlo device simulator and FIG. 3 is a view for explaining a conventional method.
Figure 3:
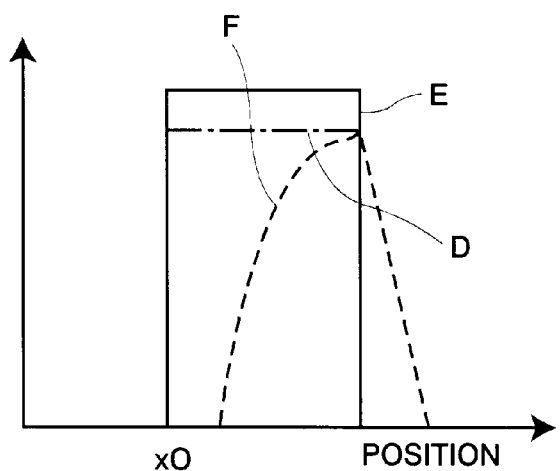

The cut out one-dimensional electric field distribution (or the potential distribution) is provided to a one-dimensional full band Monte Carlo device simulator as shown in FIG. 2 (Actually, it is usual that the electric field strength is not constant.). Here, in FIG. 2, a solid line B indicates electric field strength, and a broken line C indicates an impact ionization coefficient ($\alpha_{n,(x')}(x)$).

Condition in which a carrier (an electron or a hall) exists, which is stopping at a certain point in one dimension of this provided electric field distribution (or the potential distribution), will be considered. With regard to a kind of the carrier, in FIG. 2, an electron is assumed as the stopping carrier. In this case, the electron is accelerated in a direction (in a right side direction, here) along a line of electric force by means of the electric field, and after accelerated to some extent, it causes impact ionization. An impact ionization coefficient in this case becomes to be a distribution as a function of a position, which is shown in FIG. 2, and is expressed by $\alpha_{n,(x')}(x)$.

Here, n indicates that the carrier which causes the impact ionization is an electron (p is assumed in case of a hall.). Also, x' represents coordinates of a position where the carrier initially stopped and existed. Also, x is a position where the impact ionization is caused.

This $\alpha_{n,(x')}(x)$ or $\alpha_{p,(x')}(x)$ can be calculated correctly by using a one-dimensional full band Monte Carlo device simulator. Accordingly, initially, for each of x' and x, impact ionization coefficients for these are calculated.

The impact ionization is caused by a carrier which originally exists in a part having a strong electric field. This originally existing carrier is based on a carrier which flows in by means of a diffusion current, a carrier (which is usually modeled as SRH) which occurs due to a defect and so forth, and a carrier which occurs by means of tunneling between bands, in case of the depletion layer 4 which occurs by applying an inverse bias to a pn junction.

Here, assuming that a diffusion current in case that the carrier is an electron is $i_n^0$, a diffusion current in case that the carrier is a hall is $i_p^0$, and carriers generated by the above-described SRH and the tunneling between the bands are $G^0(x)$, generation $G^1(x)$ of an electric charge which results from acceleration of these carries and occurrence of impact ionization is obtained by means of a equation 1 described below.

$$G^1(x) = \frac{1}{q} i_n^0 \cdot \alpha_{n,(x_0)}(x) + \frac{1}{q} i_p^0 \cdot \alpha_{p,(x_\omega)}(x) + \int_{x_0}^{x_\omega} G^0(x') \alpha_{n,(x')}(x)\, dx' + \int_{x_0}^{x_\omega} G^0(x') \alpha_{p,(x')}(x)\, dx' \quad [\text{Eq. 1}]$$

Next, assuming that generation of carriers due to impact ionization which results from acceleration of the carriers that occur in $G^1(x)$ are $G^2(x)$, $G^2(x)$ is calculated by means of a equation 2 described below.

$$G^2(x) = \int_{x_0}^{x_\omega} G^1(x') \alpha_{n,(x')}(x)\, dx' + \int_{x_0}^{x_\omega} G^1(x') \alpha_{p,(x')}(x)\, dx' \quad [\text{Eq. 2}]$$

In the same manner, $G^n(x)$ to $G^{n+1}(x)$ are calculated by means of a equation 3 described below.

$$G^{n+1}(x) = \int_{x_0}^{x_\omega} G^n(x') \alpha_{n,(x')}(x)\, dx' + \int_{x_0}^{x_\omega} G^n(x') \alpha_{p,(x')}(x)\, dx' \quad [\text{Eq. 3}]$$

When n is increased and $G^n(x)$ is calculated, if $G^n(x)$ converges to a constant value, a breakdown does not occur and final electric current density can be obtained. If $G^n(x)$ does not converge and continues to be large in accordance with increase of n, it is determined that a breakdown occurs.

As an example of a method of particularly conducting calculations of the above described equation 1, equation 2 and equation 3 on a computer, a method is considered, in which an integral expressed by means of a described below equation 4 is made to be discrete as shown in a described below equation 5.

$$\int_{x_0}^{x_\omega} G^n(x')\alpha_{n,(x')}(x)dx' \quad [\text{Eq. 4}]$$

$$\sum_{i=1}^{N} G^n(x_i)\alpha_{n,(x_i)}(x)\Delta x_i \quad [\text{Eq. 5}]$$

The Second Embodiment

Next, the second embodiment of the present invention will be explained.

In a three-dimensional structure, it is expected that an electric field at a corner of the field oxidized film becomes to be further strong. Accordingly, in this case, a three-dimensional drift diffusion simulation is conducted, and an electric field distribution at a corner of the field is cut out in one dimension, and in the same manner as the case of the two dimension, one-dimensional full band Monte Carlo device simulation is conducted to calculate a distribution of impact ionization coefficients, and $G^n(x)$ is calculated from the distribution.

In accordance with the present invention, it is possible to handle the impact ionization (or breakdown) correctly.

The entire disclosure of Japanese Application No. 11-144659 filed May 25, 1999 including specification, claims, drawing and summary are incorporated herein by reference in its entirely.

What is claimed is:

1. A simulation method of a breakdown, characterized in that the method comprises steps of:
   calculating an electric field distribution by means of a drift diffusion model;
   taking out a one-dimensional electric field distribution from a result of the calculation;
   providing the electric field distribution which was taken out to a one-dimensional Monte Carlo device simulation, calculating a distribution of impact ionization coefficients, and calculating $G^n(x)$ using an equation 1 to an equation 5 described below $$G^1(x) = \frac{1}{q}i_n^0 \cdot \alpha_{n,(x_0)}(x) + \frac{1}{q}i_p^0 \cdot \alpha_{p,(x_\omega)}(x) + \int_{x_0}^{x_\omega} G^0(x')\alpha_{n,(x')}(x)dx' + \int_{x_0}^{x_\omega} G^0(x')\alpha_{p,(x')}(x)dx' \quad [\text{Eq. 1}]$$

$$G^2(x) = \int_{x_0}^{x_\omega} G^1(x')\alpha_{n,(x')}(x)dx' + \int_{x_0}^{x_\omega} G^1(x')\alpha_{p,(x')}(x)dx' \quad [\text{Eq. 2}]$$

$$G^{n+1}(x) = \int_{x_0}^{x_\omega} G^n(x')\alpha_{n,(x')}(x)dx' + \int_{x_0}^{x_\omega} G^n(x')\alpha_{p,(x')}(x)dx' \quad [\text{Eq. 3}]$$

$$\int_{x_0}^{x_\omega} G^n(x')\alpha_{n,(x')}(x)dx' \quad [\text{Eq. 4}]$$

$$\sum_{i=1}^{N} G^n(x_i)\alpha_{n,(x_i)}(x)\Delta x_i \quad [\text{Eq. 5}]$$

determining that a breakdown does not occur in case that, as a result of this calculation, as n becomes to be large, $G^n(x)$ converges to a constant value, and calculating final electric current density; and determining that a breakdown occurs in case that $G^n(x)$ becomes to be large as n increases.

2. A simulation method of a breakdown according to claim 1, characterized in that said electric field distribution is calculated by conducting a simulation by means of said drift diffusion model, in which an inverse bias is applied to a semiconductor element including an element isolating region.

3. A simulation method of a breakdown according to claim 2, characterized in that said semiconductor element has a device structure including a two-dimensional diode structure.

4. A simulation method of a breakdown according to claim 2, characterized in that said semiconductor element has a device structure including a three-dimensional diode structure.

5. A simulation method of a breakdown according to claim 2, characterized in that said element isolating region is formed of a LOCOS.

6. A simulation method of a breakdown according to claim 1, characterized in that said one-dimensional electric field distribution is taken out by cutting out a part in an electric field direction in one dimension, which has the largest electric field out of the calculated electric field distribution.

7. A simulation method of a breakdown according to claim 6, characterized in that said part which has the largest electric field is an end portion of the element isolating region formed of said LOCOS.

8. A simulation method of a breakdown, characterized in that the method comprises steps of:
   calculating an electric field distribution by means of a drift diffusion model;
   taking out a one-dimensional electric field distribution from a result of the calculation;
   providing the electric field distribution which was taken out to a one-dimensional Monte Carlo device simulation, calculating a distribution of impact ionization coefficients, and calculating $G^n(x)$ using an equation 1 to an equation 5 described below $$G^1(x) = \frac{1}{q}i_n^0 \cdot \alpha_{n,(x_0)}(x) + \frac{1}{q}i_p^0 \cdot \alpha_{p,(x_\omega)}(x) + \int_{x_0}^{x_\omega} G^0(x')\alpha_{n,(x')}(x)dx' + \int_{x_0}^{x_\omega} G^0(x')\alpha_{p,(x')}(x)dx' \quad [\text{Eq. 1}]$$

$$G^2(x) = \int_{x_0}^{x_\omega} G^1(x')\alpha_{n,(x')}(x)dx' + \int_{x_0}^{x_\omega} G^1(x')\alpha_{p,(x')}(x)dx' \quad [\text{Eq. 2}]$$

$$G^{n+1}(x) = \int_{x_0}^{x_\omega} G^n(x')\alpha_{n,(x')}(x)dx' + \int_{x_0}^{x_\omega} G^n(x')\alpha_{p,(x')}(x)dx' \quad [\text{Eq. 3}]$$

$$\int_{x_0}^{x_\omega} G^n(x')\alpha_{n,(x')}(x)dx' \quad [\text{Eq. 4}]$$

$$\sum_{i=1}^{N} G^n(x_i)\alpha_{n,(x_i)}(x)\Delta x_i \quad [\text{Eq. 5}]$$

determining that a breakdown does not occur in case that, as a result of this calculation, as n becomes to be large, $G^n(x)$ converges to a constant value, and calculating final electric current density; and determining that a breakdown occurs in case that $G^n(x)$ becomes to be large as n increases, wherein said electric field distribution is calculated by conducting a simulation by means of said drift diffusion model, in which an inverse bias is applied to a semiconductor element including an element isolating region;

said semiconductor element has a device structure including a two-dimensional diode structure;

said element isolating region is formed of a LOCOS and said one-dimensional electric field distribution is taken out by cutting out a part in an electric field direction in one dimension, which has the largest electric field out of the calculated electric field distribution.

9. A simulation method of a breakdown, characterized in that the method comprises steps of:

calculating an electric field distribution by means of a drift diffusion model;

taking out a one-dimensional electric field distribution from a result of the calculation;

providing the electric field distribution which was taken out to a one-dimensional Monte Carlo device simulation, calculating a distribution of impact ionization coefficients, and calculating $G^n(x)$ using an equation 1 to an equation 5 described below $$G^1(x) = \frac{1}{q} i_n^0 \cdot \alpha_{n,(x_0)}(x) + \frac{1}{q} i_p^0 \cdot \alpha_{p,(x_\omega)}(x) + \int_{x_0}^{x_\omega} G^0(x') \alpha_{n,(x')}(x) dx' + \int_{x_0}^{x_\omega} G^0(x') \alpha_{p,(x')}(x) dx' \quad [\text{Eq. 1}]$$

$$G^2(x) = \int_{x_0}^{x_\omega} G^1(x') \alpha_{n,(x')}(x) dx' + \int_{x_0}^{x_\omega} G^1(x') \alpha_{p,(x')}(x) dx' \quad [\text{Eq. 2}]$$

$$G^{n+1}(x) = \int_{x_0}^{x_\omega} G^n(x') \alpha_{n,(x')}(x) dx' + \int_{x_0}^{x_\omega} G^n(x') \alpha_{p,(x')}(x) dx' \quad [\text{Eq. 3}]$$

$$\int_{x_0}^{x_\omega} G^n(x') \alpha_{n,(x')}(x) dx' \quad [\text{Eq. 4}]$$

$$\sum_{i=1}^{N} G^n(x_i) \alpha_{n,(x_i)}(x) \Delta x_i \quad [\text{Eq. 5}]$$

determining that a breakdown does not occur in case that, as a result of this calculation, as n becomes to be large, $G^n(x)$ converges to a constant value, and calculating final electric current density; and determining that a breakdown occurs in case that $G^n(x)$ becomes to be large as n increases, wherein said electric field distribution is calculated by conducting a simulation by means of said drift diffusion model, in which an inverse bias is applied to a semiconductor element including an element isolating region;

said semiconductor element has a device structure including a three-dimensional diode structure;

said element isolating region is formed of a LOCOS;

said one-dimensional electric field distribution is taken out by cutting out a part in an electric field direction in one dimension, which has the largest electric field out of the calculated electric field distribution and said part which has the largest electric field is an end portion of the element isolating region formed of said LOCOS.

* * * * *